Feb. 26, 1963  I. SCHEIDLINGER  3,078,902
DEVICE FOR TIRES

Filed Nov. 1, 1961  2 Sheets-Sheet 1

Feb. 26, 1963 — I. SCHEIDLINGER — 3,078,902
DEVICE FOR TIRES
Filed Nov. 1, 1961 — 2 Sheets-Sheet 2
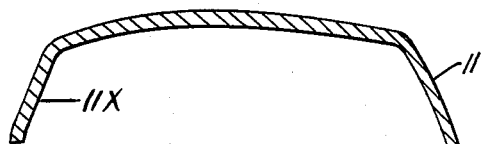
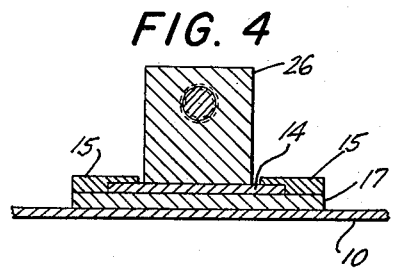
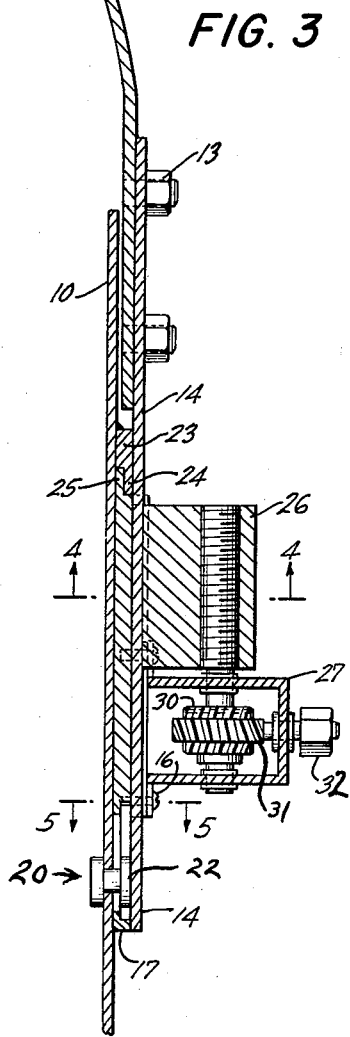
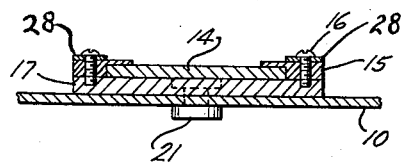

United States Patent Office 3,078,902
Patented Feb. 26, 1963

3,078,902
DEVICE FOR TIRES
Irving Scheidlinger, 323 Maryland Ave., Freeport, N.Y.
Filed Nov. 1, 1961, Ser. No. 149,294
1 Claim. (Cl. 152—213)

This invention relates to a device for easy and rapid attachment to tires to obtain improved traction on slippery or ice covered roads.

Many devices to obtain improved traction between automobile tires and slippery road surfaces are known. However, a large number of them, for example, tire chains require the wheel to be raised in order to dispose the device securely on the wheel.

It is an object of this invention to provide a device which is easily disposed upon a wheel without raising the wheels and similarly easily removed from the wheel, again without the necessity of raising the wheel off the ground.

It is another object to provide a device which may be used with a plurality of wheels of varying diameters.

It is a further object to provide a device the wearing surfaces of which are inexpensive and easily replaced when worn.

Figure 1:
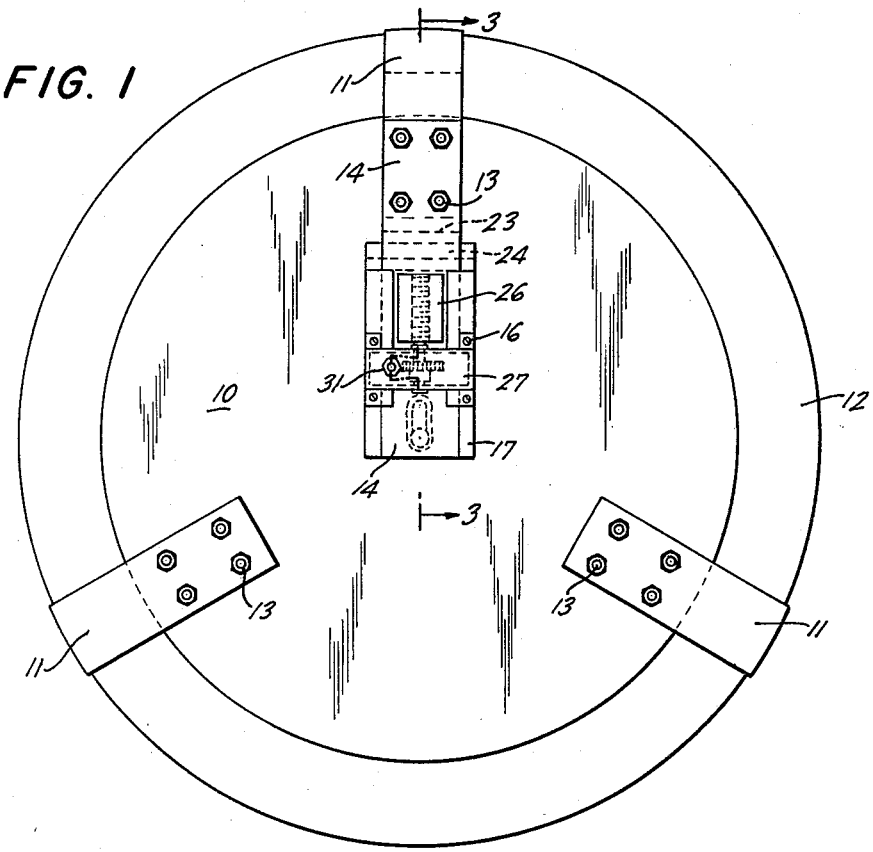
Figure 2:
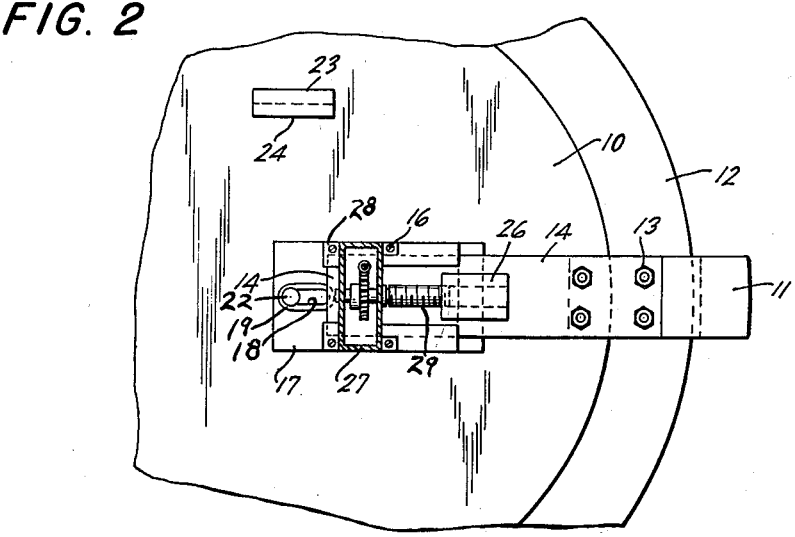

These and other objects of this invention will become apparent upon reading the following descriptive disclosure taken in conjunction with the accompanying drawing in which:

FIG. 1 is a front view of the device disposed upon and secured to a tire on a wheel, FIG. 2 is a view, broken away in part, showing the swingable arm of the device disposed in open position, to permit the device to be disposed upon the tire, FIG. 3 is a section view, broken away in part and taken on line 3—3 of FIG. 1 and showing the structure for raising or lowering the jaw on the swingable arm, and showing the manner of slide locking the swingable arm to the base plate, FIG. 4 is a view taken on line 4—4 of FIG. 3 and showing the structure for selective movement of the jaw on the swingable arm, and FIG. 5 is a view taken on line 5—5 of FIG. 3 and showing the slide plate secured in the swingable arm and the manner of securing the swingable arm to the base plate.

Turning to the drawing a flat disc 10 of metal of suitable thickness is provided with a plurality of three suitably strong claws 11 adapted to be disposed about a rubber tire 12. The claws 11 are disposed equidistant about the tire at 120 degrees apart. Two of the claws are each removeably secured to the disc 10 by a plurality of bolts 13.

The third claw 11 is removeably secured by a plurality of bolts 13 to a slide plate 14. Slide plate 14 is slidably disposed captively in a pair of parallel spaced-apart opposed guide rails 15. The guide rails 15 are secured by means of threaded bolts 16 into suitable threaded apertures to a swingable plate 17.

As shown in FIG. 3, the bottom portion of the swingable plate 17 is provided with an oblong slot 18 having a peripheral ledge 19 of substantially one-half the thickness of plate 17. The pin portion of a dual flanged holder 20 is disposed through center of plate 10 and through the slot 18. A round flange 21 is disposed on the inner surface of the disc 10 and fixedly secured to the pin portion of the holder 20 (FIG. 3). A second round flange 22 is fixed to the other end of the pin portion and disposed on the ledge 19 and in the groove formed thereby. Thus swing plate 17 is captively held to the disc 10 and swingable relative thereto. However, swing plate 17 is also linearly moveable the length of slot 18 relative to the pin of holder 20.

As shown in FIGS. 2 and 3, an undercut lock bar 23 is made integral with disc 10 as by being welded thereto. The lock bar 23 is provided with an overhanging lip 24 and is equally disposed away from both of the fixed claws 11.

The swingable plate 17 is provided at the end away from the slot 18 with a narrow shelf 25, which is lockingly engaged under lip 24 of the lock bar 23 when the swingable arm is secured to a tire on the wheel.

The slide plate 14 may be selectively moved on the swing plate 17 by a number of different means. Preferably the slide plate 14 is moved by means employing a conventional jack handle such as is used with jacks to jack up a car wheel when fixing a flat tire.

A preferred means of moving the slide plate 14 is to secure as by welding a block 26 thereto. The block 26 is provided with a suitable threaded aperture therein. A metal cage 27 is provided on each side with a pair of apertured feet 28 and secured by bolts 16 through apertured guide plates 15 into threaded wells in the swingable plate 17.

A suitable threaded rod 29 is disposed in the threaded aperture of block 26. The rod 29 is provided at its non-threaded end with a conventional worm gear 30. A co-acting conventional worm gear 31 is mated to gear 30 at a right angle thereto and a nut 32 such as is used on car wheels is fixed to the shaft of the gear 31.

In the removal operation of the device of this invention, FIG. 3, the moveable claw 11 on the swingable arm is moved by rotating threaded rod 29 to its extreme outward position so that its hook 11X will easily slide over the tire mounted on a wheel. The swingable plate 17 is then pushed down in slot 18 (FIG. 3) so that its shelf 25 is disposed suitably below ledge 24 of the fixed bar 23. In this position the swingable arm can be rotated ninety degrees or more toward one of the fixed claws 11 and the device may then be removed from the wheel.

To place the device on a wheel on the ground, the disc 10 is inserted under the fender hood if necessary, with the two fixed claws to the right or left side and with the swingable arm resting against one of these fixed arms. To secure the device rigidly to the tire the swingable arm is swung into place 120 degrees from a fixed arm. Next the swing plate is pushed outwardly so that the shelf 25 thereof is disposed lockedly beneath the ledge 24. Now the nut 32 is turned so as to bring the moveable claw 11 slideably down until this claw 11 and the fixed claws 11 on plate 10 are firmly embedded into the tire tread. In this position the pin of the holder 20 will be at the bottom of the slot 18 resting thereagainst.

This invention has been illustrated by means of a single embodiment but it is not limited thereto as it is of a broader scope.

I claim:

An anti-skid device for tire mounted automobile wheels comprising a base plate adapted to be disposed against the wheel, a pair of fixed suitably spaced-apart tire engaging claws secured to said plate, a swingable plate having a ledged slot at one end pivotally secured in said slot to said base plate, an undercut lock bar secured fixedly to said base plate intermediate said fixed claws and adapted to engage the outer edge of the other end of said swingable plate, a moveable claw adapted to engage a tire slidingly disposed on said swingable plate, manually operated means secured to said moveable claw and said swingable arm for selectively sliding said claw into and out of engagement with said lock bar and the tire on said wheel, pin holder means captively disposed centrally in said base plate and in said ledged slot permitting a sliding movement of said swingable plate on said pin holder means to facilitate engagement of said swingable plate to said lock bar, a pair of parallel disposed spaced-apart guide rails secured to said swingable plate, said moveable claw being captively and slidingly held in said guide rails, said manually operated means comprising an aperture threaded block fixedly secured to said moveable claw, a cage fixedly secured to said swingable plate, a threaded rod disposed in the threaded aperture of said block, a worm gear disposed on the free end of said rod in said cage, a second worm gear having a shaft extending through said cage secured to said cage and engaging at a right angle said worm gear on said rod, and means secured to the shaft of said second worm gear for the rotation thereof to selectively slide said moveable claw relative to said swingable plate between said guide rails.

References Cited in the file of this patent
UNITED STATES PATENTS

| | | |
|---|---|---|
| 2,174,944 | Leggett | Oct. 3, 1939 |
| 2,510,451 | Williams et al. | June 6, 1950 |
| 2,912,036 | Minutilla | Nov. 10, 1959 |